United States Patent
Shih

(10) Patent No.: US 10,215,625 B2
(45) Date of Patent: Feb. 26, 2019

(54) LASER VEHICLE HEADLIGHT SYSTEM AND DETECTING METHOD THEREOF

(71) Applicant: Automotive Research & Testing Center, Changhua County (TW)

(72) Inventor: Chun-Yao Shih, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 142 days.

(21) Appl. No.: 15/382,752

(22) Filed: Dec. 19, 2016

(65) Prior Publication Data
US 2018/0172507 A1  Jun. 21, 2018

(51) Int. Cl.
| | |
|---|---|
| *G01J 1/42* | (2006.01) |
| *F21S 41/20* | (2018.01) |
| *F21S 41/14* | (2018.01) |
| *F21S 41/36* | (2018.01) |
| *B60Q 1/00* | (2006.01) |
| *F21S 41/32* | (2018.01) |
| *F21S 41/16* | (2018.01) |
| *F21S 41/176* | (2018.01) |
| *G01J 1/04* | (2006.01) |
| *G01J 1/58* | (2006.01) |

(52) U.S. Cl.
CPC .......... *G01J 1/4257* (2013.01); *B60Q 1/0023* (2013.01); *F21S 41/14* (2018.01); *F21S 41/16* (2018.01); *F21S 41/176* (2018.01); *F21S 41/285* (2018.01); *F21S 41/321* (2018.01); *F21S 41/36* (2018.01); *G01J 1/0411* (2013.01); *G01J 1/58* (2013.01)

(58) Field of Classification Search
CPC .......... F21S 41/36; F21S 41/176; F21S 41/16; F21S 41/321; F21S 41/14; F21S 41/285; G01J 1/4257; G01J 1/58; G01J 1/0411; B60Q 1/0023
See application file for complete search history.

(56) References Cited

U.S. PATENT DOCUMENTS

| | | | |
|---|---|---|---|
| 8,957,356 B2* | 2/2015 | Moriya | G01J 1/4257 250/201.9 |
| 2012/0106178 A1* | 5/2012 | Takahashi | B60Q 1/0035 362/459 |
| 2013/0027962 A1 | 1/2013 | Takahashi et al. | |
| 2014/0268846 A1 | 9/2014 | Nakazato | |
| 2015/0022898 A1* | 1/2015 | Yamakawa | B60K 35/00 359/633 |

\* cited by examiner

*Primary Examiner* — Tony Ko
(74) *Attorney, Agent, or Firm* — CKC & Partners Co., LLC

(57) ABSTRACT

A laser vehicle headlight system for detecting an incident laser light and outputting a headlight includes a headlight body, an optical unit and a light leakage detecting unit. The optical unit is disposed on the headlight body and receives the incident laser light. The optical unit includes a fluorescent member which is disposed on an initial light path of the incident laser light and is illuminated by the incident laser light to induce a stable light traveling along a stable light path. The light leakage detecting unit is disposed on the headlight body. The light leakage detecting unit includes a first elliptical reflecting surface and a light detector. The first elliptical reflecting surface has a first elliptical reflecting focal point and is corresponding to the fluorescent member. The light detector is disposed at the first elliptical reflecting focal point of the first elliptical reflecting surface.

17 Claims, 10 Drawing Sheets

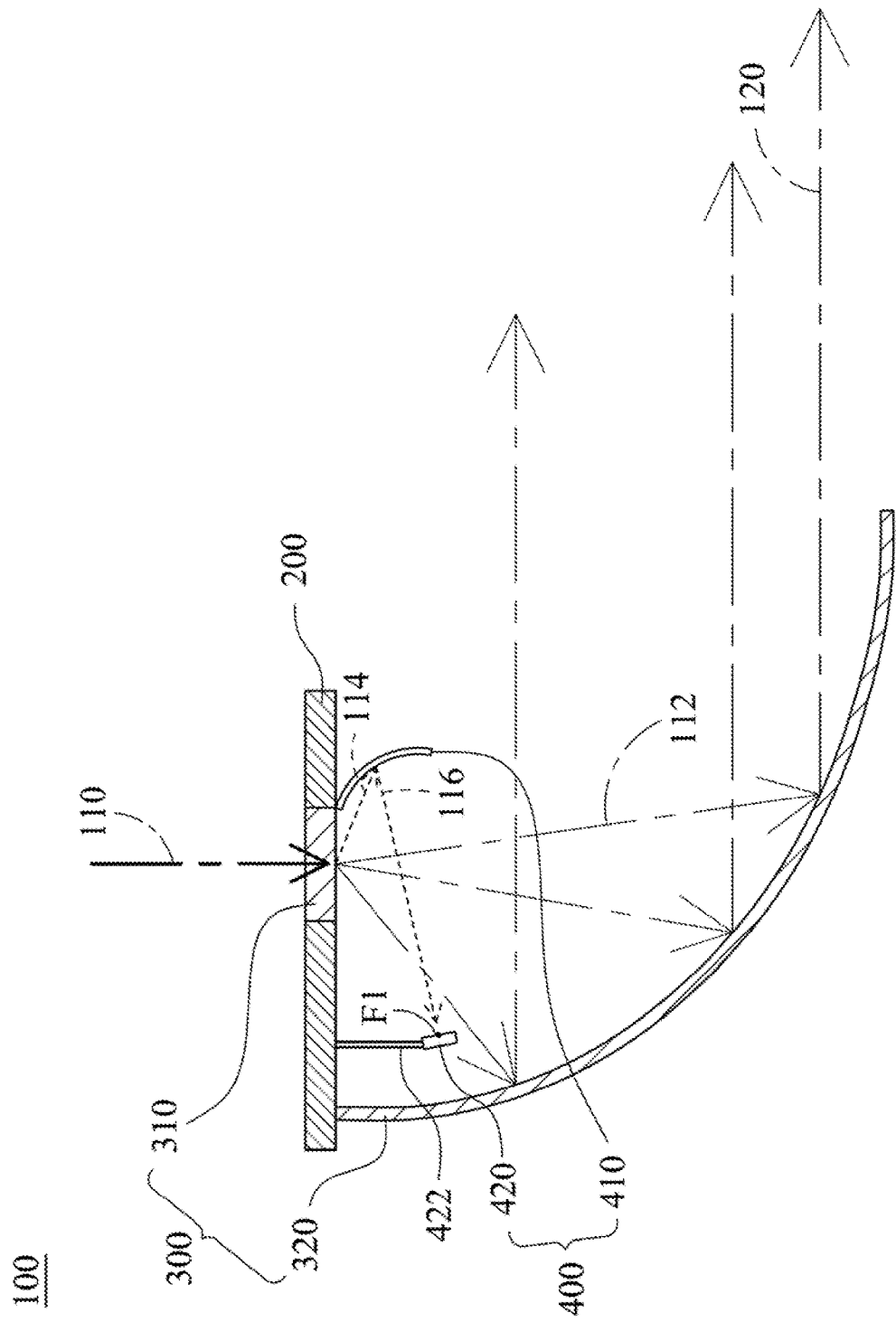

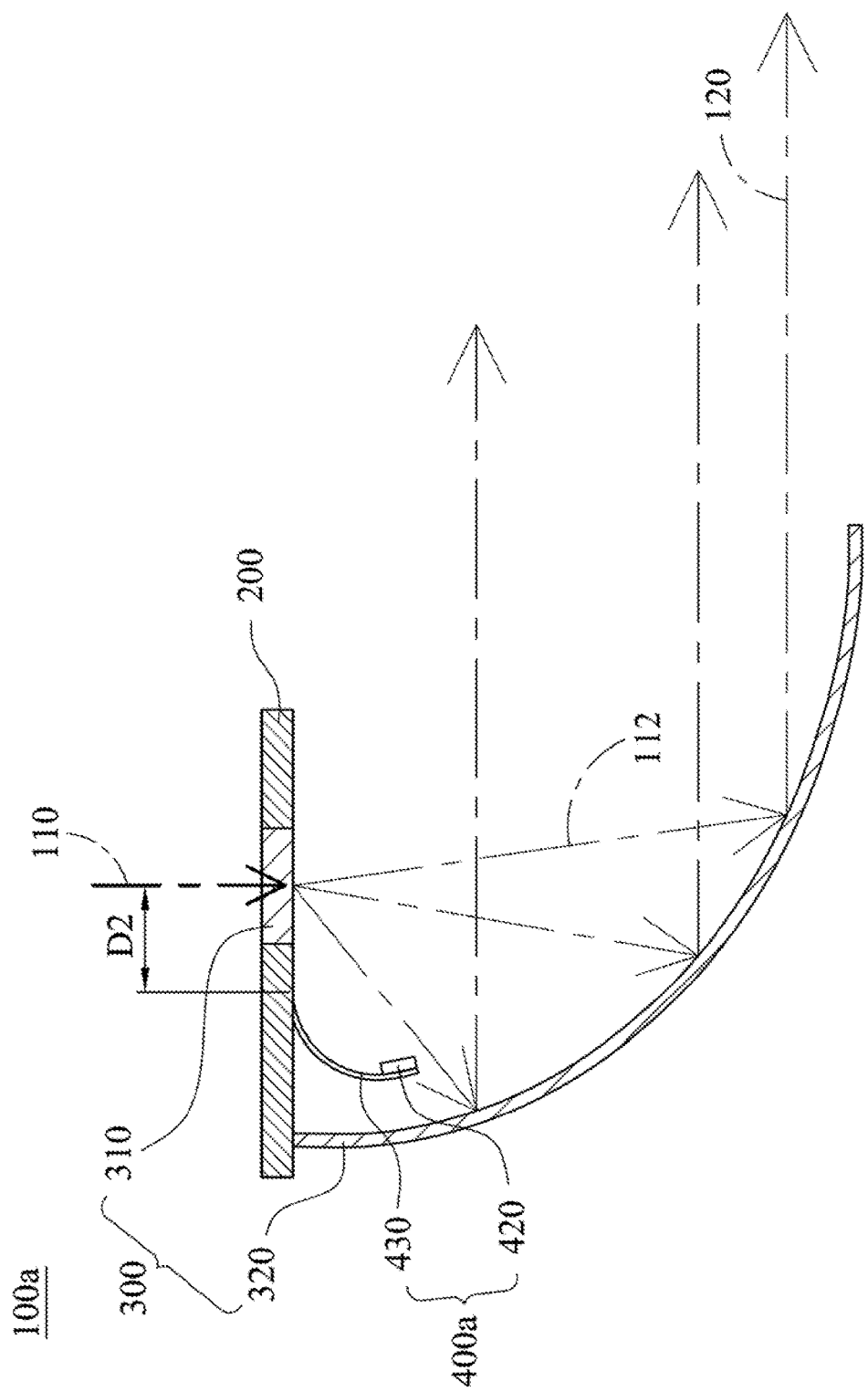

LASER VEHICLE HEADLIGHT SYSTEM AND DETECTING METHOD THEREOF

BACKGROUND

Technical Field

The present disclosure relates to a laser vehicle headlight system and a detecting method of the laser vehicle headlight system. More particularly, the laser vehicle headlight system and the detecting method of the laser vehicle headlight system use specific elliptical reflecting surfaces with one common focal point to completely collect the leakage lights.

Description of Related Art

In the currently known vehicle headlight systems, there are three common types of light source technologies: a conventional light source, a LED light source, and a laser light source. Most technologies are based on the conventional light source. The LED light source is used in high or medium price category vehicles. The laser light source is only mounted on few types of specific vehicles and can realize energy saving, small size, high brightness and long-range illumination. For Advanced Driver Assistance Systems (ADAS), the range of image recognition can be further extended by using the laser light source, thus enhancing security and attaining the effect of energy saving, environmental protection and innovation.

The laser light source is different from the conventional light source and the LED light source. Instead of directly emitting light, the laser light source is produced by the yellow fluorescent member that is illuminated by the blue laser beam. In order to meet illumination needs for the vehicle, the power of the blue laser beam with Class IV is more than 500 mW. The blue laser beam may render adverse effect to the human body due to its huge power. Therefore, it is commercially desirable to develop a detecting system and method with high safety, high brightness and real-time detection.

SUMMARY

According to one aspect of the present disclosure, a laser vehicle headlight system for detecting an incident laser light and outputting a headlight includes a headlight body, an optical unit and a light leakage detecting unit. The optical unit is disposed on the headlight body and receives the incident laser light. The optical unit includes a fluorescent member which is disposed on an initial light path of the incident laser light and is illuminated by the incident laser light to induce a stable light traveling along a stable light path. The light leakage detecting unit is disposed on the headlight body. The light leakage detecting unit includes a first elliptical reflecting surface and a light detector. The first elliptical reflecting surface has a first elliptical reflecting focal point and is corresponding to the fluorescent member. The light detector is disposed at the first elliptical reflecting focal point of the first elliptical reflecting surface.

According to another aspect of the present disclosure, a laser vehicle headlight system for detecting an incident laser light and outputting a headlight includes a headlight body, an optical unit and a light leakage detecting unit. The optical unit is disposed on the headlight body and receives the incident laser light. The optical unit includes a fluorescent member and a headlight reflecting surface. The fluorescent member is disposed on an initial light path of the incident laser light and is illuminated by the incident laser light to induce a stable light and an offset detecting light. The stable light travels along a stable light path, and the offset detecting light travels along an offset detecting light path. The headlight reflecting surface is disposed at the stable light path. The headlight reflecting surface receives the stable light, and the stable light is then reflected by the headlight reflecting surface to generate the headlight. The light leakage detecting unit is disposed on the headlight body and is located on the offset detecting light path. The light leakage detecting unit includes a first elliptical reflecting surface and a light detector. The first elliptical reflecting surface has a first elliptical reflecting focal point and is corresponding to the fluorescent member. The first elliptical reflecting surface is adjacent to the fluorescent member. The first elliptical reflecting surface receives the offset detecting light, and the offset detecting light is then reflected by the first elliptical reflecting surface to generate a leakage light. The leakage light travels along a leakage light path. The light detector is disposed at the first elliptical reflecting focal point of the first elliptical reflecting surface and is located on the leakage light path. The light detector receives the leakage light and outputs a light leakage signal.

According to another aspect of the present disclosure, a detecting method of the laser vehicle headlight system provides a light inducing step and a leakage light collecting step. The light inducing step is for transmitting the incident laser light to the fluorescent member so as to induce the stable light from the fluorescent member. The leakage light collecting step is for checking whether or not an offset detecting light is induced by the fluorescent member according to the light detector. When the fluorescent member induces the offset detecting light, the first elliptical reflecting surface receives the offset detecting light, and the offset detecting light is then reflected by the first elliptical reflecting surface to generate a leakage light. The light detector receives the leakage light and outputs a light leakage signal.

BRIEF DESCRIPTION OF THE DRAWINGS

The present disclosure can be more fully understood by reading the following detailed description of the embodiment, with reference made to the accompanying drawings as follows:

FIG. 1C is a schematic view showing an abnormal state of the laser vehicle headlight system of FIG. 1A;

FIG. 2B is a schematic view showing a normal state of the laser vehicle headlight system of FIG. 2A;

DETAILED DESCRIPTION

Figure 1A:
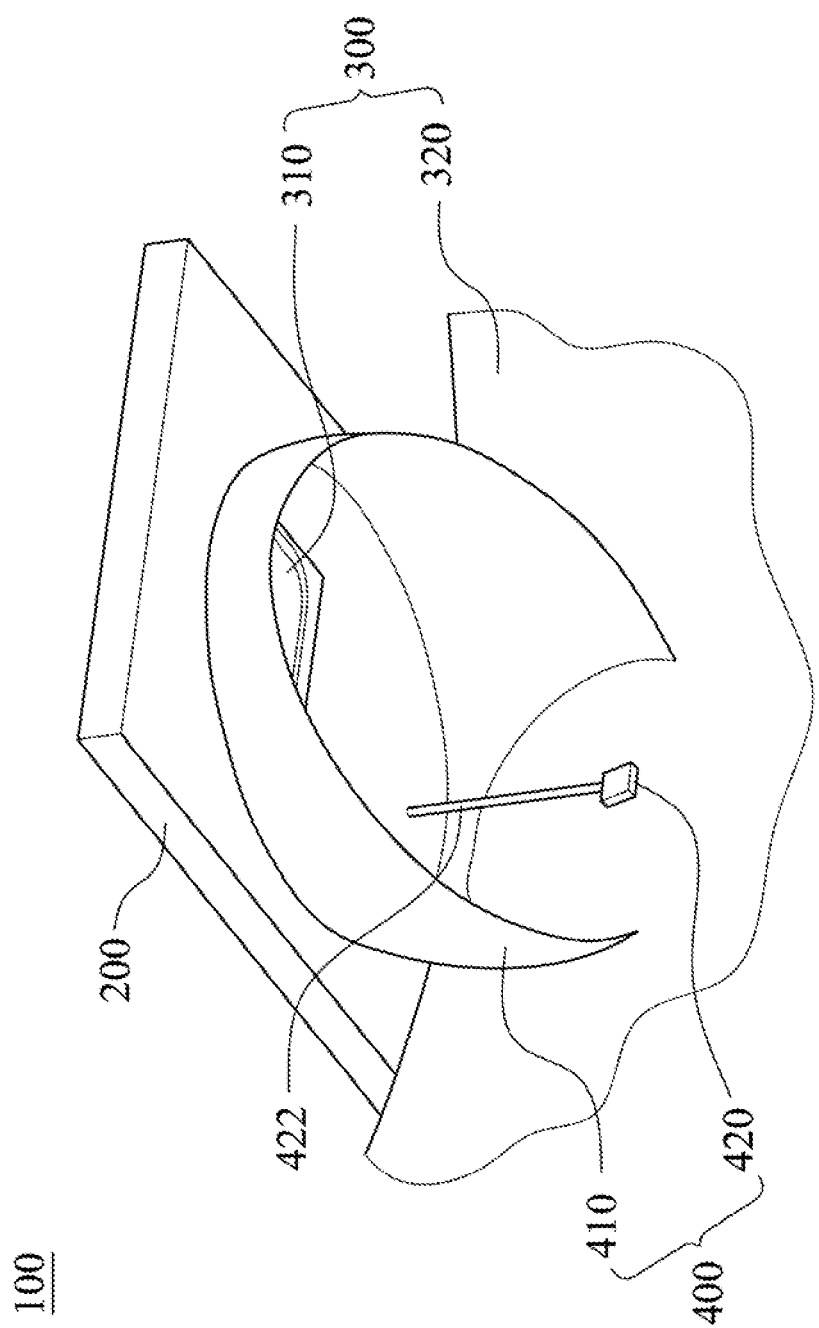
FIG. 1A is a schematic view showing a laser vehicle headlight system according to one embodiment of the present disclosure.
Figure 1B:
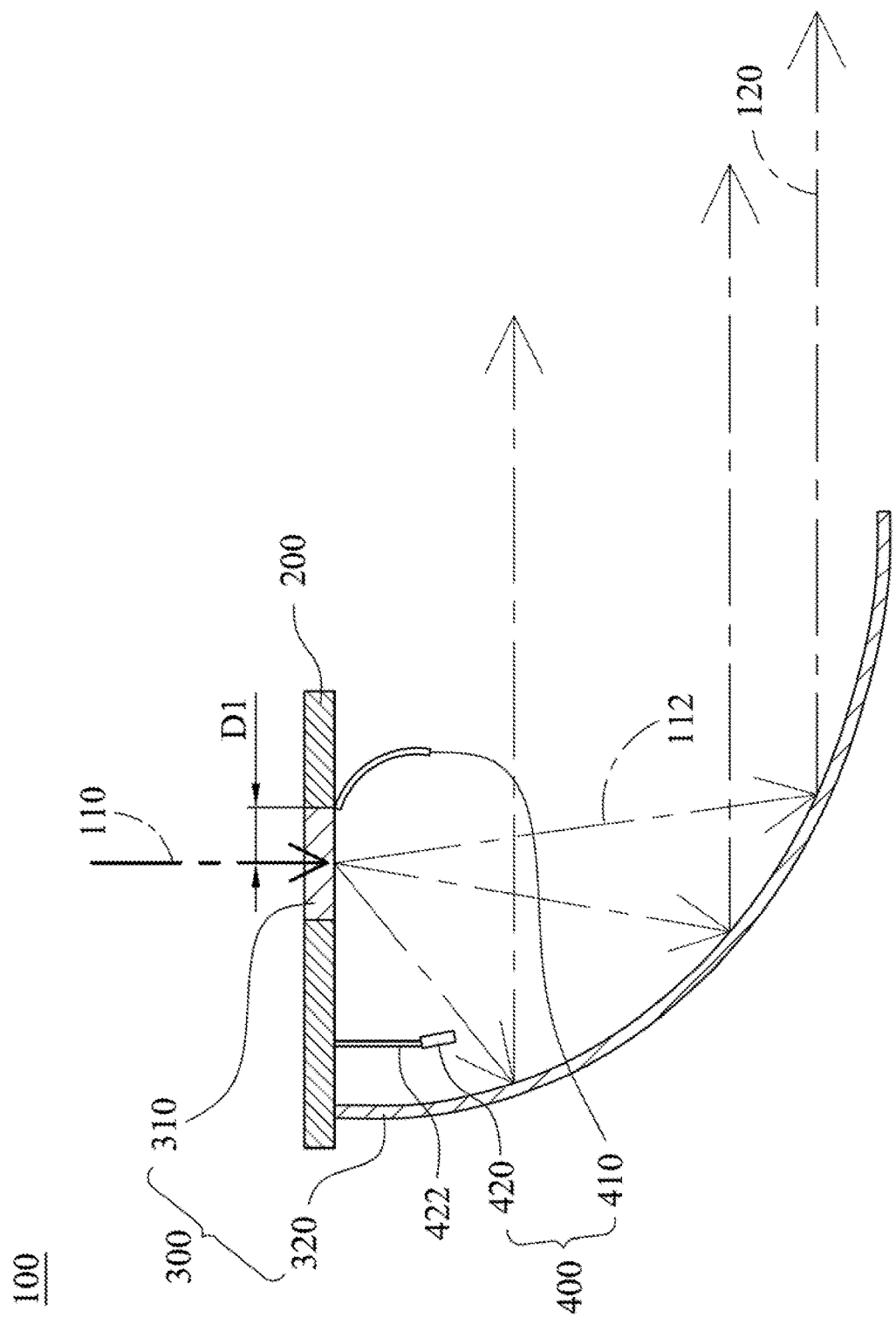
FIG. 1B is a schematic view showing a normal state of the laser vehicle headlight system of FIG. 1A.

FIG. 1A is a schematic view showing a laser vehicle headlight system 100 according to one embodiment of the present disclosure; FIG. 1B is a schematic view showing a normal state of the laser vehicle headlight system 100 of FIG. 1A; and FIG. 1C is a schematic view showing an abnormal state of the laser vehicle headlight system 100 of FIG. 1A. In FIGS. 1A-1C, the laser vehicle headlight system 100 for detecting an incident laser light 110 and outputting a headlight 120 includes a headlight body 200, an optical unit 300 and a light leakage detecting unit 400.

The headlight body 200 is mounted on a vehicle and has a rectangular plate-like shape. The optical unit 300 is disposed on the headlight body 200 and receives the incident laser light 110. The optical unit 300 includes a fluorescent member 310 and a headlight reflecting surface 320. The fluorescent member 310 is disposed on an initial light path of the incident laser light 110. When the laser vehicle headlight system 100 is in the normal state, the fluorescent member 310 is illuminated by the incident laser light 110 to induce a stable light 112 traveling along a stable light path. On the contrary, when the laser vehicle headlight system 100 is in the abnormal state, a light induced from the fluorescent member 310 has the issue of the space color shift, which refers to a "yellow halo" resulting from a blue shift in the middle and yellow shift in periphery. The space color shift may render adverse effect to the human body in the case of extremely high color temperature at certain angles. The light having the space color shift is defined as a light source of a light leakage detection. The fluorescent member 310 is illuminated by the incident laser light 110 to induce the stable light 112 and an offset detecting light 114. The stable light 112 travels along a stable light path, and the offset detecting light 114 travels along an offset detecting light path. The offset detecting light 114 is the light source of the light leakage detection. The stable light path is different from the offset detecting light path. In addition, the incident laser light 110 is a blue laser beam, and the blue laser beam has a wavelength which is greater than or equal to 400 nm and less than or equal to 500 nm. The fluorescent member 310 is a yellow fluorescent member. When the yellow fluorescent member (i.e. the fluorescent member 310) is illuminated by the blue laser beam (i.e. the incident laser light 110), the yellow fluorescent member generates a white light, i.e. the stable light 112. The light source of the light leakage detection (i.e. the offset detecting light 114) has the phenomenon of yellow halo produced by the yellow fluorescent member. Moreover, the headlight reflecting surface 320 is disposed at the stable light path of the stable light 112. The headlight reflecting surface 320 receives the stable light 112, and the stable light 112 is then reflected by the headlight reflecting surface 320 to generate the headlight 120 which is a white light.

The light leakage detecting unit 400 is disposed on the headlight body 200. The light leakage detecting unit 400 includes a first elliptical reflecting surface 410 and a light detector 420. The first elliptical reflecting surface 410 has a first elliptical reflecting focal point F1 and is corresponding to the fluorescent member 310. The first elliptical reflecting surface 410 is adjacent to the fluorescent member 310. There is a first distance D1 between the first elliptical reflecting surface 410 and the initial light path of the incident laser light 110. The first distance D1 can be adjusted according to the change of the relative position between the fluorescent member 310 and the first elliptical reflecting surface 410. Furthermore, the light detector 420 is disposed at the first elliptical reflecting focal point F1 of the first elliptical reflecting surface 410. The light detector 420 is indirectly connected to the headlight body 200 via a supporting member 422. In other words, two ends of the supporting member 422 are connected to the light detector 420 and the headlight body 200, respectively. The light detector 420 is a blue light detector for receiving a specific reflected light from the first elliptical reflecting surface 410. The first elliptical reflecting surface 410 has a first aspect ratio. In addition, the light leakage detecting unit 400 is located on the offset detecting light path of the offset detecting light 114. The first elliptical reflecting surface 410 receives the offset detecting light 114, and the offset detecting light 114 is then reflected by the first elliptical reflecting surface 410 to generate a leakage light 116. The leakage light 116 travels along a leakage light path to illuminate the light detector 420. The leakage light 116 is the specific reflected light reflected from the first elliptical reflecting surface 410. In other words, the light detector 420 is located on the leakage light path of the leakage light 116. The light detector 420 is disposed at the first elliptical reflecting focal point F1 of the first elliptical reflecting surface 410. The light detector 420 receives the leakage light 116 and outputs a light leakage signal to a display device or a warning device (not shown) for alerting the driver that the laser vehicle headlight system 100 has been in the abnormal state. Therefore, the laser vehicle headlight system 100 of the of the present disclosure can use a specific elliptical reflecting surface to collect the leakage light 116 which is induced from the fluorescent member 310 and received by the light detector 420, thereby instantly supervising abnormal conditions according to the light detector 420. It not only can supervise abnormal conditions, but also increase the safety and reliability of the laser vehicle headlight system 100. Furthermore, the laser vehicle headlight system 100 has a simple structure and is relatively suitable for use in high energy requirements. The first elliptical reflecting surface 410 combined with the headlight reflecting surface 320 is utilized to detect the light having yellow shift in periphery, thereby preventing influence of brightness of the original headlight 120.

Figure 2A:
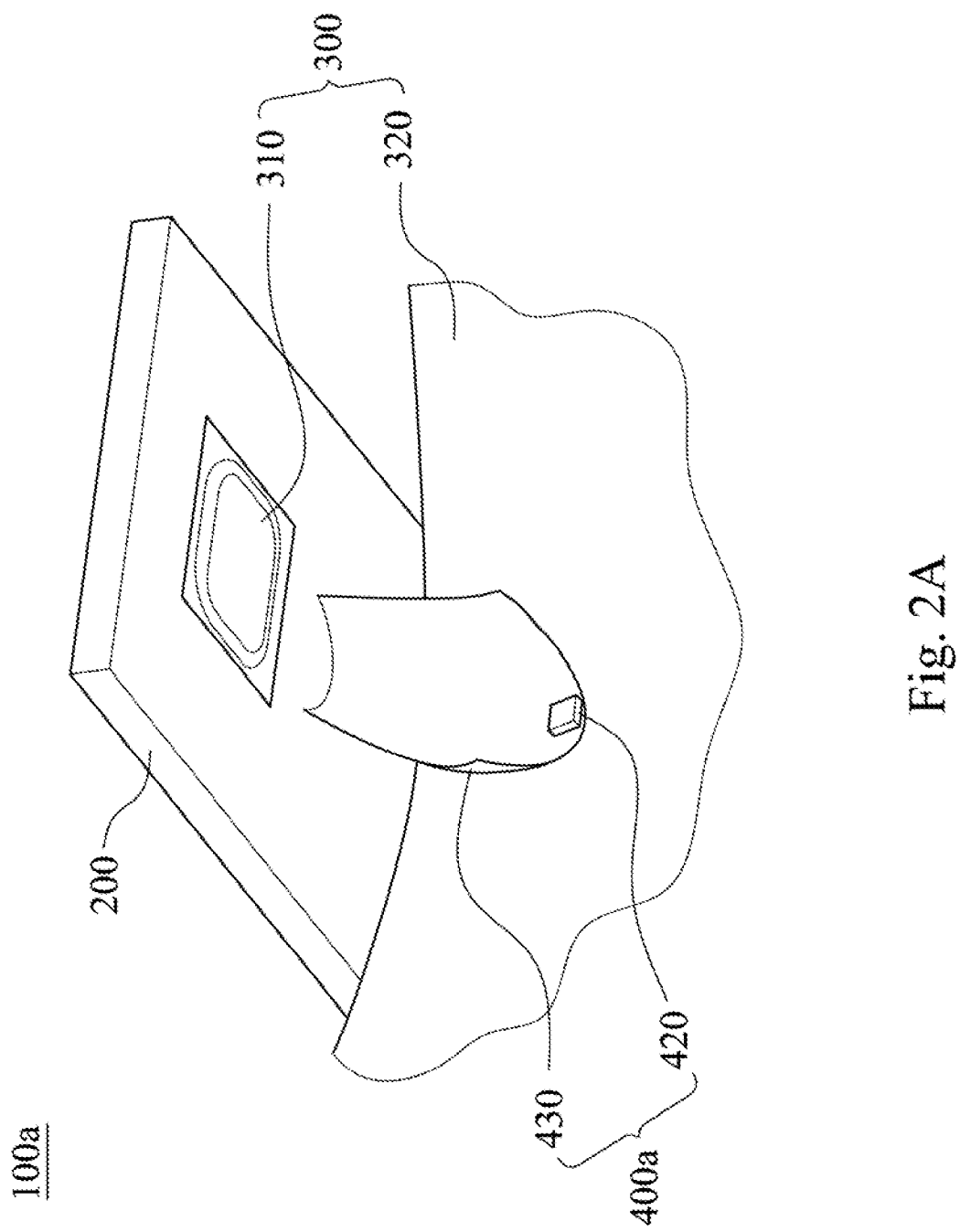
FIG. 2A is a schematic view showing a laser vehicle headlight system according to another embodiment of the present disclosure.
Figure 2C:
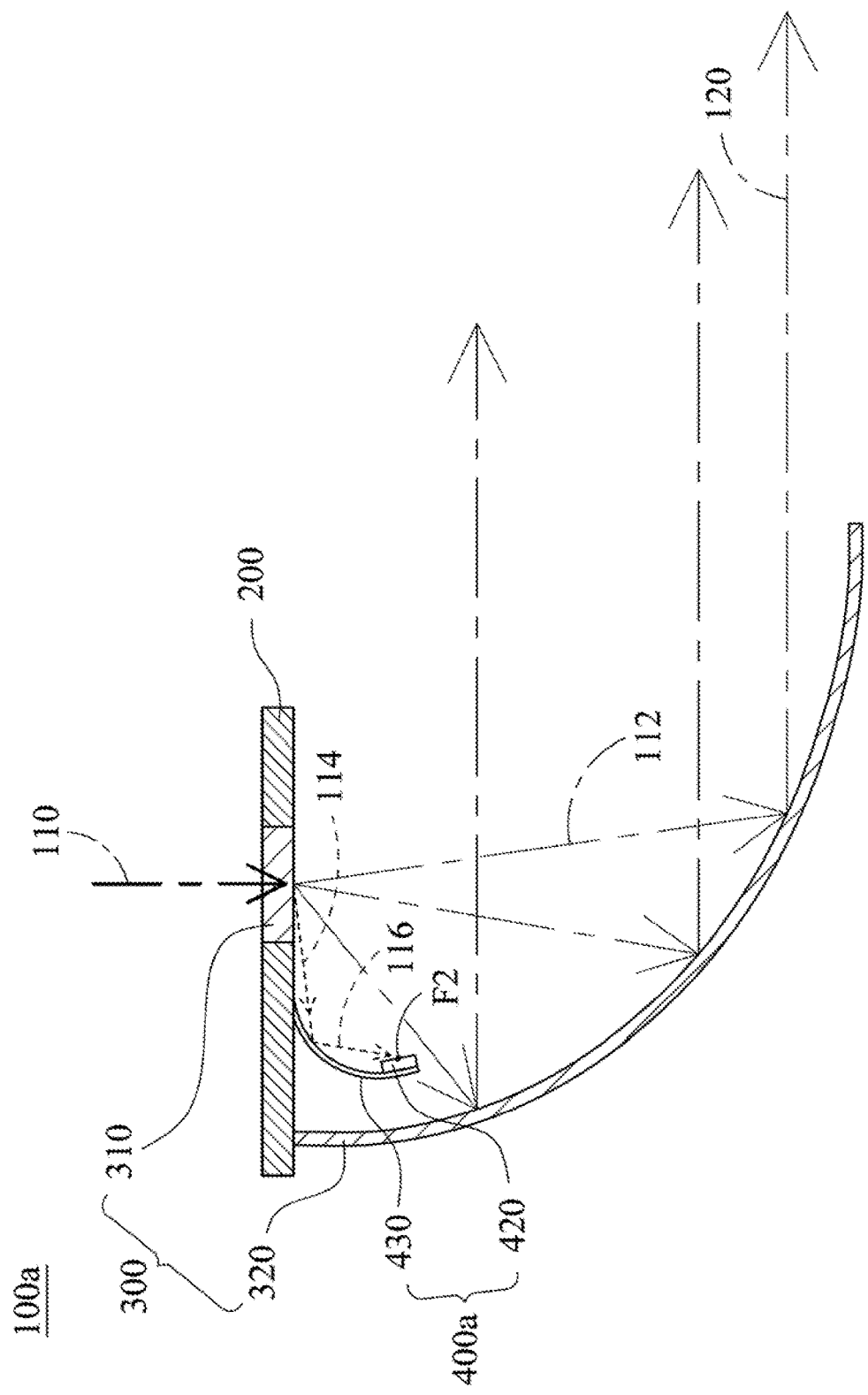
FIG. 2C is a schematic view showing an abnormal state of the laser vehicle headlight system of FIG. 2A.

FIG. 2A is a schematic view showing a laser vehicle headlight system 100a according to another embodiment of the present disclosure; FIG. 2B is a schematic view showing a normal state of the laser vehicle headlight system 100a of FIG. 2A; and FIG. 2C is a schematic view showing an abnormal state of the laser vehicle headlight system 100a of FIG. 2A. In FIGS. 2A-2C, the laser vehicle headlight system 100a for detecting an incident laser light 110 and outputting a headlight 120 includes a headlight body 200, an optical unit 300 and a light leakage detecting unit 400a.

In FIGS. 2A-2C, the details of the headlight body 200 and the optical unit 300 are the same as the headlight body 200 and the optical unit 300 of FIGS. 1A-1C, respectively. In FIGS. 2A-2C, the laser vehicle headlight system 100a further includes the light leakage detecting unit 400a. The light leakage detecting unit 400a includes a light detector 420 and a second elliptical reflecting surface 430. The second elliptical reflecting surface 430 is disposed on the headlight body 200 and has a second elliptical reflecting focal point F2. One end of the second elliptical reflecting surface 430 is connected to the headlight body 200. The second elliptical reflecting surface 430 is adjacent to the fluorescent member 310 and is corresponding to the fluorescent member 310. There is a second distance D2 between the second elliptical reflecting surface 430 and the initial light path of the incident laser light 110. The second distance D2 may be adjusted according to the change of the relative position between the fluorescent member 310 and the second elliptical reflecting surface 430. The second elliptical reflecting surface 430 has a second aspect ratio. In addition, the light detector 420 is connected to the other end of the second elliptical reflecting surface 430. The light detector 420 is disposed at the second elliptical reflecting focal point F2. The light detector 420 is a blue light detector for receiving a specific reflected light (i.e. the leakage light 116) from the second elliptical reflecting surface 430. Accordingly, the laser vehicle headlight system 100a of the of the present disclosure can employ a specific elliptical reflecting surface to collect the leakage light 116 which is induced from the fluorescent member 310 and received by the light detector 420 so as to instantly supervise abnormal conditions according to the light detector 420. The laser vehicle headlight system 100a not only can detect abnormal conditions in real time, but also increase the safety and reliability. Moreover, the second elliptical reflecting surface 430 combined with the headlight reflecting surface 320 is used to detect the light having yellow shift in periphery so as to prevent influence of brightness of the original headlight 120.

Figure 3A:
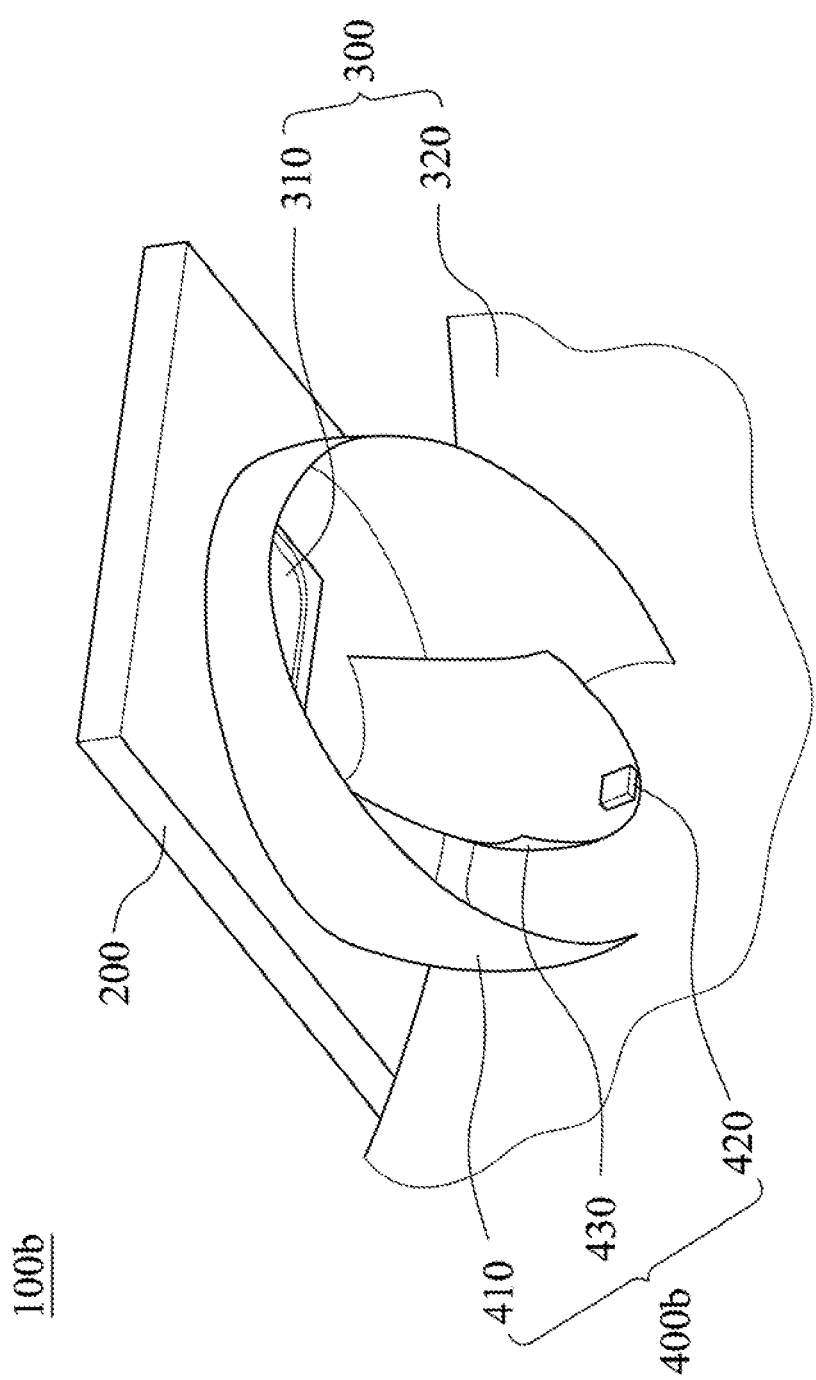
FIG. 3A is a schematic view showing a laser vehicle headlight system according to further another embodiment of the present disclosure.
Figure 3B:
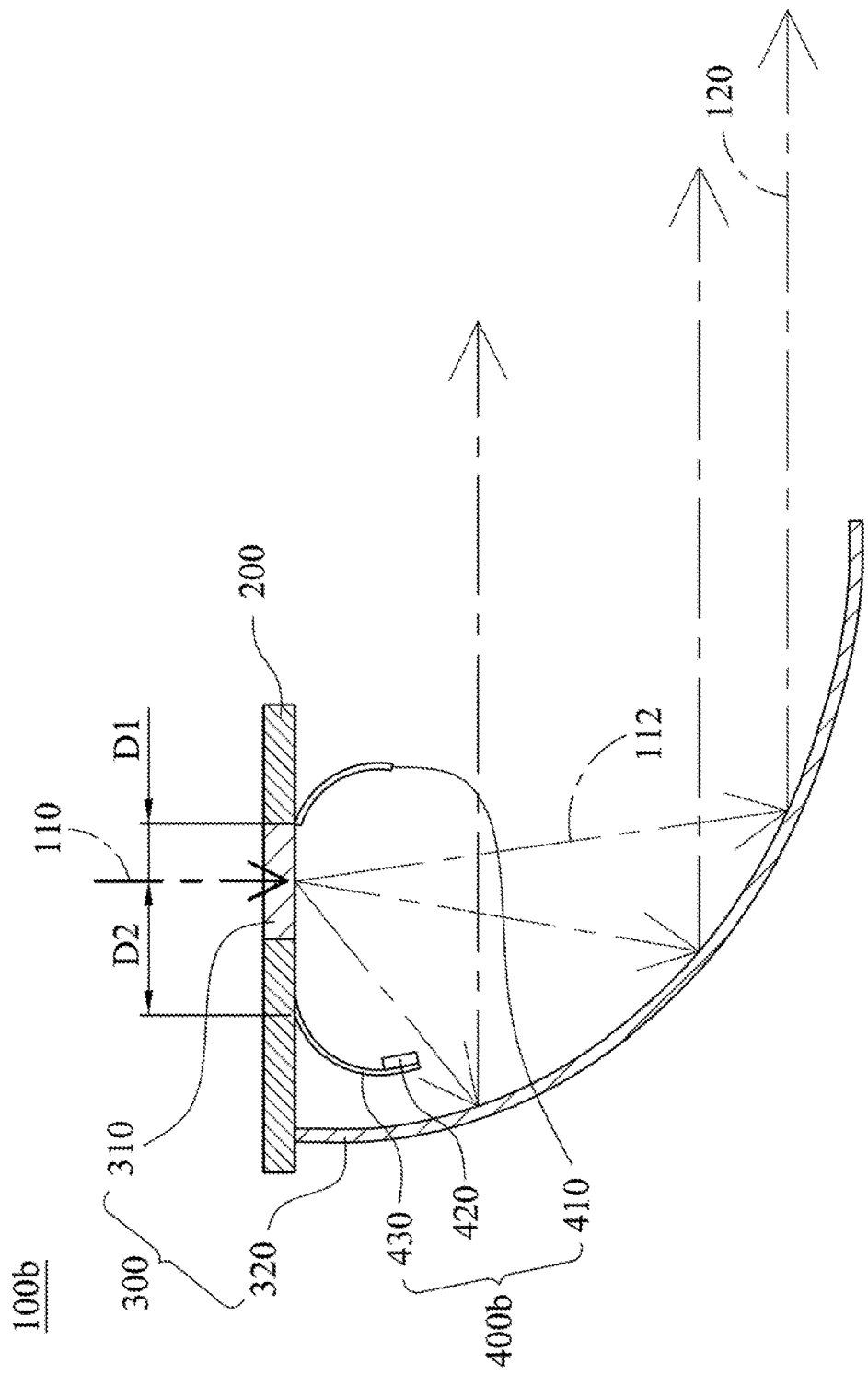
FIG. 3B is a schematic view showing a normal state of the laser vehicle headlight system of FIG. 3A.
Figure 3C:
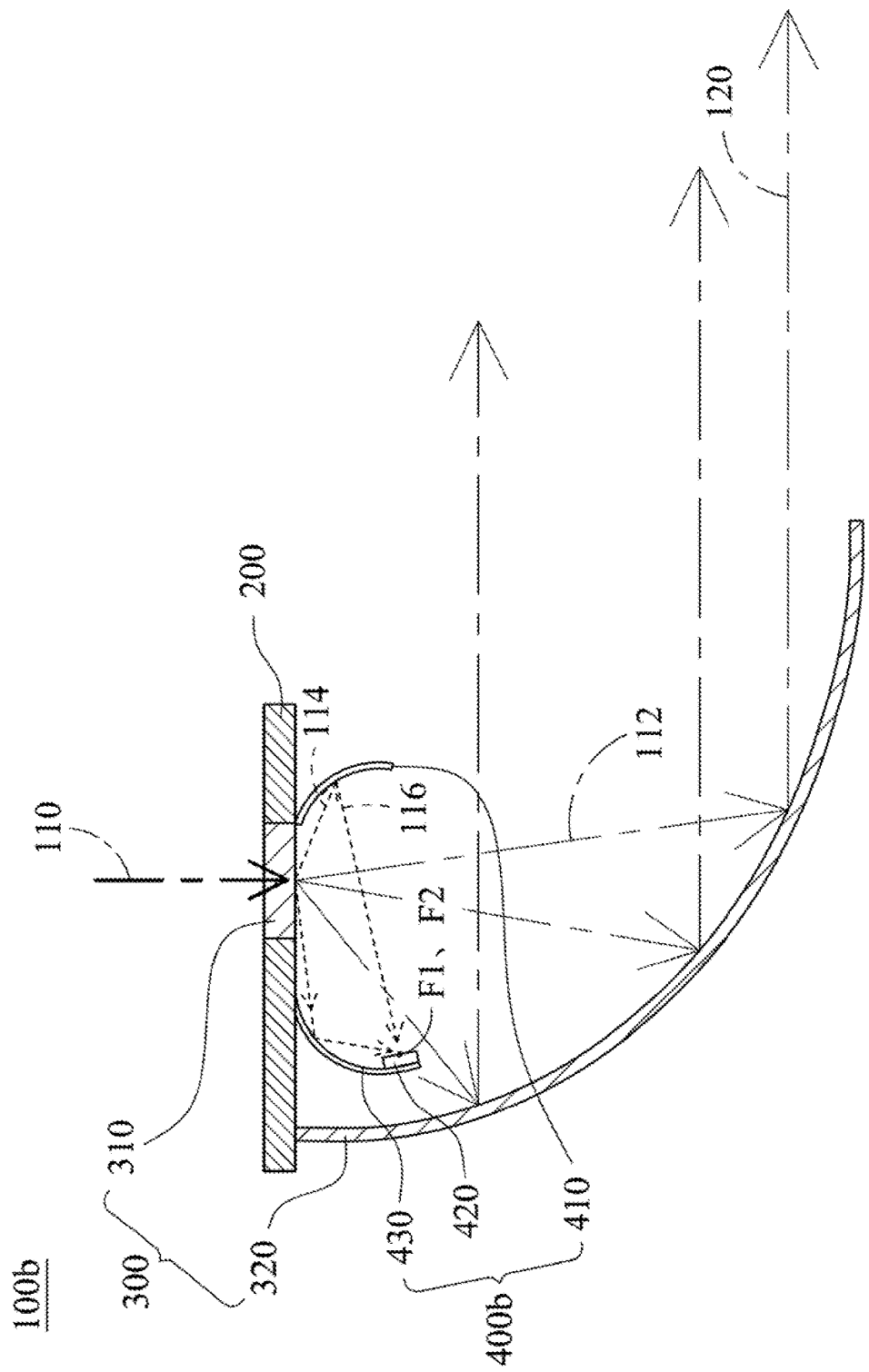
FIG. 3C is a schematic view showing an abnormal state of the laser vehicle headlight system of FIG. 3A.

FIG. 3A is a schematic view showing a laser vehicle headlight system 100b according to further another embodiment of the present disclosure; FIG. 3B is a schematic view showing a normal state of the laser vehicle headlight system 100b of FIG. 3A; and FIG. 3C is a schematic view showing an abnormal state of the laser vehicle headlight system 100b of FIG. 3A. In FIGS. 3A-3C, the laser vehicle headlight system 100b for detecting an incident laser light 110 and outputting a headlight 120 includes a headlight body 200, an optical unit 300 and a light leakage detecting unit 400b.

In FIGS. 3A-3C, the details of the headlight body 200 and the optical unit 300 are the same as the headlight body 200 and the optical unit 300 of FIGS. 1A-1C, respectively. In FIGS. 3A-3C, the laser vehicle headlight system 100b further includes the light leakage detecting unit 400b. The light leakage detecting unit 400b includes a first elliptical reflecting surface 410, a light detector 420 and a second elliptical reflecting surface 430. The first elliptical reflecting surface 410 has a first elliptical reflecting focal point F1 and is corresponding to the fluorescent member 310. The first elliptical reflecting surface 410 is adjacent to the fluorescent member 310. There is a first distance D1 between the first elliptical reflecting surface 410 and the initial light path of the incident laser light 110. Furthermore, the second elliptical reflecting surface 430 has a second elliptical reflecting focal point F2. One end of the second elliptical reflecting surface 430 is connected to the headlight body 200. The second elliptical reflecting surface 430 is adjacent to the fluorescent member 310 and is corresponding to the fluorescent member 310. There is a second distance D2 between the second elliptical reflecting surface 430 and the initial light path of the incident laser light 110. In addition, the first elliptical reflecting surface 410 and the second elliptical reflecting surface 430 are corresponding to each other and both surround the fluorescent member 310. The first elliptical reflecting surface 410 and the second elliptical reflecting surface 430 are separated from each other and are both disposed on the headlight body 200. In detail, the first elliptical reflecting surface 410 surrounds the fluorescent member 310 with a first angle that ranges from greater than 180 degrees to less than 360 degrees. The second elliptical reflecting surface 430 surrounds the fluorescent member 310 with a second angle that ranges from greater than 0 degrees to less than 90 degrees. The first distance D1 is greater than the second distance D2. The second elliptical reflecting focal point F2 and the first elliptical reflecting focal point F1 overlap each other and are both located at a position of the light detector 420. Moreover, the light detector 420 is connected to the other end of the second elliptical reflecting surface 430. The second elliptical reflecting surface 430 is connected between the light detector 420 and the headlight body 200. The light detector 420 is a blue light detector for receiving plural specific reflected lights (i.e. the leakage lights 116) from the second elliptical reflecting surface 430 and the first elliptical reflecting surface 410. When the laser vehicle headlight system 100b is in the abnormal state, the light detector 420 combined with a ring structure of plural elliptical reflecting surfaces may collect the leakage lights 116 reflected by multiple elliptical reflecting surfaces to increase the safety and reliability of the laser vehicle headlight system 100b. In addition, the first elliptical reflecting surface 410 and the second elliptical reflecting surface 430 combined with the headlight reflecting surface 320 are employed to completely collect the leakage lights 116 according to one common focal point of multiple elliptical reflecting surfaces, thereby preventing influence of brightness of the original headlight 120. A coverage area of the first elliptical reflecting surface 410 is greater than a first lower limit value. A coverage area of the second elliptical reflecting surface 430 is greater than a second lower limit value. The first lower limit value is greater than the second lower limit value so as to make sure that all leakage lights are disposed at the common focal point of multiple elliptical reflecting surfaces. In other words, the partial overlapping ring structure of multiple elliptical reflecting surfaces can avoid a portion of the leakage lights passing through a gap between the first elliptical reflecting surface 410 and the second elliptical reflecting surface 430 or a boundary of one of the elliptical reflecting surfaces. If a portion of the leakage lights cannot be collected by the elliptical reflecting surfaces, it must cause loss of light energy, thus affecting the safety and reliability of the laser vehicle headlight system 100b. Therefore, the special structure of the present disclosure can overcome the above problems and detect the leakage lights without waste of light energy.

In FIG. 3A, the first elliptical reflecting surface 410 and the second elliptical reflecting surface 430 are separated from each other and corresponding to each other. In another embodiment (not shown), the first elliptical reflecting surface 410 is integrally connected to the second elliptical reflecting surface 430 to form a complete ring. The reflecting surface with the complete ring is connected to the headlight body 200 and fully surrounds the fluorescent member 310 for conducting the light leakage detection.

Figure 4:
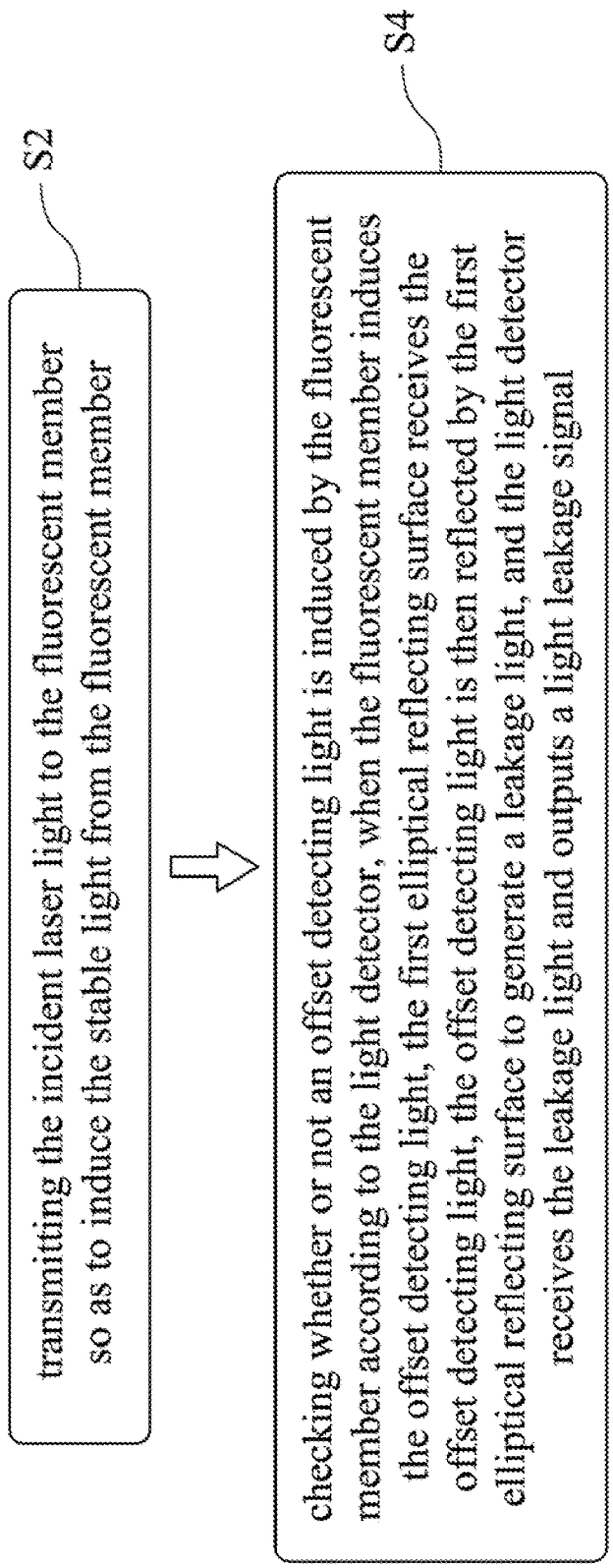
FIG. 4 is a flow chart showing a detecting method of the laser vehicle headlight system according to one embodiment of the present disclosure.

FIG. 4 is a flow chart showing a detecting method 500 of the laser vehicle headlight system 100 of FIG. 1 according to one embodiment of the present disclosure. The detecting method 500 of the laser vehicle headlight system 100 provides a light inducing step S2 and a leakage light collecting step S4. The light inducing step S2 is for transmitting the incident laser light 110 to the fluorescent member 310 so as to induce the stable light 112 from the fluorescent member 310. The leakage light collecting step S4 is for checking whether or not an offset detecting light 114 is induced by the fluorescent member 310 according to the light detector 420. When the fluorescent member 310 only induces the stable light 112 without the offset detecting light 114, the laser vehicle headlight system 100 is in the normal state, and the light detector 420 does not receive any leakage light. On the contrary, when the fluorescent member induces the stable light 112 and the offset detecting light 114, the laser vehicle headlight system 100 is in the abnormal state. The first elliptical reflecting surface 410 receives the offset detecting light 114, and the offset detecting light 114 is then reflected by the first elliptical reflecting surface 410 to generate a leakage light 116. The light detector 420 receives the leakage light 116 and outputs a light leakage signal. For the same reason, the detecting method 500 can also be applied to the embodiments of the laser vehicle headlight system 100a, 100b in FIGS. 2A-2C and 3A-3C. In FIGS. 2A-2C, the detecting method 500 of the laser vehicle headlight system 100a provides the leakage light collecting step S4 for collecting the offset detecting light 114 by the second elliptical reflecting surface 430 so as to generate a leakage light 116. The light detector 420 is disposed at the second elliptical reflecting focal point F2 of the second elliptical reflecting surface 430. In FIGS. 3A-3C, the detecting method 500 of the laser vehicle headlight system 100b provides the leakage light collecting step S4 for simultaneously collecting the offset detecting lights 114 by the first elliptical reflecting surface 410 and the second elliptical reflecting surface 430. Then, the offset detecting lights 114 are reflected by the first elliptical reflecting surface 410 and the second elliptical reflecting surface 430 to generate plural leakage lights 116. The light detector 420 receives the leakage lights 116. The second elliptical reflecting focal point F2 and the first elliptical reflecting focal point F1 overlap each other and are both located at a position of the light detector 420. Hence, the detecting method 500 of the laser vehicle headlight system 100, 100a, 100b of the present disclosure can use multiple elliptical reflecting surfaces with one common focal point to completely collect the leakage lights 116 which are induced from the fluorescent member 310 and received by the light detector 420, so that the detecting method 500 can not only supervise abnormal conditions, but also increase the safety and reliability of the laser vehicle headlight system 100, 100a, 100b.

According to the aforementioned embodiments, the advantages of the present disclosure are described as follows.

1. The laser vehicle headlight system and detecting method thereof of the present disclosure can use multiple elliptical reflecting surfaces with one common focal point to completely collect the leakage lights which are induced from the fluorescent member and received by the light detector so as to supervise abnormal conditions and increase the safety and reliability of the system.

2. The laser vehicle headlight system and detecting method thereof of the present disclosure can collect all leakage lights at the common focal point of multiple elliptical reflecting surfaces, thus detecting the leakage lights without waste of light energy of the headlight and preventing influence of brightness of the headlight.

3. The laser vehicle headlight system and detecting method thereof of the present disclosure can utilize multiple elliptical reflecting surfaces combined with the headlight reflecting surface to detect the light having yellow shift in periphery, thereby preventing influence of brightness of the original headlight.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A laser vehicle headlight system for detecting an incident laser light and outputting a headlight, the laser vehicle headlight system comprising:
 a headlight body;
 an optical unit disposed on the headlight body and receiving the incident laser light, and the optical unit comprising:
  a fluorescent member disposed on an initial light path of the incident laser light and illuminated by the incident laser light to induce a stable light traveling along a stable light path; and
 a light leakage detecting unit disposed on the headlight body, and the light leakage detecting unit comprising:
  a first elliptical reflecting surface having a first elliptical reflecting focal point and adjacent to the fluorescent member,
 wherein there is a first distance between the first elliptical reflecting surface and the initial light path of the incident laser light; and
  a light detector disposed at the first elliptical reflecting focal point of the first elliptical reflecting surface.

2. The laser vehicle headlight system of claim 1, wherein the incident laser light is a blue laser beam, the fluorescent member is a yellow fluorescent member, the light detector is a blue light detector, and the blue laser beam has a wavelength which is greater than or equal to 400 nm and less than or equal to 500 nm.

3. The laser vehicle headlight system of claim 1, wherein the optical unit further comprising:
 a headlight reflecting surface disposed at the stable light path, wherein the headlight reflecting surface receives the stable light, the stable light is then reflected by the headlight reflecting surface to generate the headlight which is a white light.

4. The laser vehicle headlight system of claim 1, wherein the light leakage detecting unit further comprising:
 a second elliptical reflecting surface disposed on the headlight body and having a second elliptical reflecting focal point, wherein the second elliptical reflecting surface is connected between the light detector and the headlight body, the second elliptical reflecting focal point and the first elliptical reflecting focal point overlap each other and are located at a position of the light detector.

5. The laser vehicle headlight system of claim 4, wherein the first elliptical reflecting surface and the second elliptical reflecting surface are separated from each other and corresponding to each other.

6. The laser vehicle headlight system of claim 4, wherein the first elliptical reflecting surface surrounds the fluorescent member with a first angle that ranges from greater than 180 degrees to less than 360 degrees, the second elliptical reflecting surface surrounds the fluorescent member with a second angle that ranges from greater than 0 degrees to less than 90 degrees, there is a second distance between the second elliptical reflecting surface and the initial light path of the incident laser light, and the first distance is greater than the second distance.

7. A detecting method of the laser vehicle headlight system of claim 1, comprising:
 providing a light inducing step, wherein the light inducing step is for transmitting the incident laser light to the fluorescent member so as to induce the stable light from the fluorescent member; and
 providing a leakage light collecting step, wherein the leakage light collecting step is for checking whether or not an offset detecting light is induced by the fluorescent member according to the light detector, when the fluorescent member induces the offset detecting light, the first elliptical reflecting surface receives the offset detecting light, the offset detecting light is then reflected by the first elliptical reflecting surface to generate a leakage light, and the light detector receives the leakage light and outputs a light leakage signal.

8. The detecting method of the laser vehicle headlight system of claim 7, wherein,
the light leakage detecting unit further comprises a second elliptical reflecting surface, the second elliptical reflecting surface is disposed on the headlight body and has a second elliptical reflecting focal point; and
in the leakage light collecting step, the first elliptical reflecting surface and the second elliptical reflecting surface simultaneously receives the offset detecting light, the offset detecting light is then reflected by the first elliptical reflecting surface and the second elliptical reflecting surface to generate a leakage light, and the second elliptical reflecting focal point and the first elliptical reflecting focal point overlap each other and are located at a position of the light detector.

9. The detecting method of the laser vehicle headlight system of claim 8, wherein the first elliptical reflecting surface and the second elliptical reflecting surface are separated from each other and corresponding to each other.

10. The detecting method of the laser vehicle headlight system of claim 8, wherein the first elliptical reflecting surface surrounds the fluorescent member with a first angle that ranges from greater than 180 degrees to less than 360 degrees, the second elliptical reflecting surface surrounds the fluorescent member with a second angle that ranges from greater than 0 degrees to less than 90 degrees, there is a second distance between the second elliptical reflecting surface and the initial light path of the incident laser light, and the first distance is greater than the second distance.

11. The detecting method of the laser vehicle headlight system of claim 7, wherein the incident laser light is a blue laser beam, the fluorescent member is a yellow fluorescent member, the light detector is a blue light detector, and the blue laser beam has a wavelength which is greater than or equal to 400 nm and less than or equal to 500 nm.

12. The detecting method of the laser vehicle headlight system of claim 7, wherein the optical unit further comprising:
a headlight reflecting surface disposed at the stable light path, wherein the headlight reflecting surface receives the stable light, the stable light is then reflected by the headlight reflecting surface to generate the headlight which is a white light.

13. A laser vehicle headlight system for detecting an incident laser light and outputting a headlight, the laser vehicle headlight system comprising:
a headlight body;
an optical unit disposed on the headlight body and receiving the incident laser light, and the optical unit comprising:
a fluorescent member disposed on an initial light path of the incident laser light and illuminated by the incident laser light to induce a stable light and an offset detecting light, wherein the stable light travels along a stable light path, and the offset detecting light travels along an offset detecting light path; and
a headlight reflecting surface disposed at the stable light path, wherein the headlight reflecting surface receives the stable light, and the stable light is then reflected by the headlight reflecting surface to generate the headlight; and
a light leakage detecting unit disposed on the headlight body and comprising:
a first elliptical reflecting surface having a first elliptical reflecting focal point and located on the offset detecting light path, wherein the first elliptical reflecting surface is adjacent to the fluorescent member, the first elliptical reflecting surface receives the offset detecting light, and the offset detecting light is then reflected by the first elliptical reflecting surface to generate a leakage light, and the leakage light travels along a leakage light path; and
a light detector disposed at the first elliptical reflecting focal point of the first elliptical reflecting surface and located on the leakage light path, wherein the light detector receives the leakage light and outputs a light leakage signal.

14. The laser vehicle headlight system of claim 13, wherein the light leakage detecting unit further comprising:
a second elliptical reflecting surface disposed on the headlight body and having a second elliptical reflecting focal point, wherein the second elliptical reflecting surface is connected between the light detector and the headlight body, the second elliptical reflecting focal point and the first elliptical reflecting focal point overlap each other and are located at a position of the light detector.

15. The laser vehicle headlight system of claim 14, wherein the first elliptical reflecting surface and the second elliptical reflecting surface are separated from each other and corresponding to each other.

16. The laser vehicle headlight system of claim 14, wherein the first elliptical reflecting surface surrounds the fluorescent member with a first angle that ranges from greater than 180 degrees to less than 360 degrees, the second elliptical reflecting surface surrounds the fluorescent member with a second angle that ranges from greater than 0 degrees to less than 90 degrees, there is a first distance between the first elliptical reflecting surface and the initial light path of the incident laser light, there is a second distance between the second elliptical reflecting surface and the initial light path of the incident laser light, and the first distance is greater than the second distance.

17. The laser vehicle headlight system of claim 13, wherein the incident laser light is a blue laser beam, the fluorescent member is a yellow fluorescent member, the light detector is a blue light detector, and the blue laser beam has a wavelength which is greater than or equal to 400 nm and less than or equal to 500 nm.

* * * * *